United States Patent [19]

Noe

[11] Patent Number: 5,368,829
[45] Date of Patent: Nov. 29, 1994

[54] CONTINUOUS ASH EXTRACTION PROCESS

[75] Inventor: Ronald O. Noe, Hopkins, S.C.

[73] Assignee: Westinghouse Electric Corporation, Pittsburgh, Pa.

[21] Appl. No.: 118,342

[22] Filed: Sep. 9, 1993

[51] Int. Cl.$^5$ ............................................. B01D 11/00
[52] U.S. Cl. ..................................... 423/20; 423/341; 423/343
[58] Field of Search ................... 423/20, 341, 343; 252/301.1, 628

[56] References Cited

U.S. PATENT DOCUMENTS

| | | | |
|---|---|---|---|
| 3,882,040 | 5/1975 | Auge et al. | 423/20 |
| 4,177,241 | 12/1979 | Divins et al. | 423/20 |
| 4,268,409 | 5/1981 | Ga et al. | 252/301.1 |
| 4,509,978 | 4/1985 | Greenhalgh | 423/20 |
| 4,749,519 | 6/1988 | Koehly et al. | 423/20 |
| 4,787,979 | 11/1988 | Kolarik et al. | 210/634 |
| 4,814,046 | 3/1989 | Johnson et al. | 204/1.5 |
| 4,869,794 | 9/1989 | Koehly et al. | 204/130 |

Primary Examiner—Donald P. Walsh
Assistant Examiner—Frederick H. Voss

[57] ABSTRACT

Radioactive metal is recovered from solid oxides of the metal by exposing the oxide to a cocurrent flow of a first acid solution in a first contactor to form partially reacted oxides and a solution containing the metal. The first solution containing the metal is drawn off and the partially reacted oxides are passed through a countercurrent flow of a second acid solution in a second contactor to form reaction residues and a second solution containing the metal. The second solution containing the metal is drawn off and the reaction residues are passed through a countercurrent flow of wash water in a third contactor. The reaction residues are then separated from the wash water and dried.

20 Claims, 1 Drawing Sheet

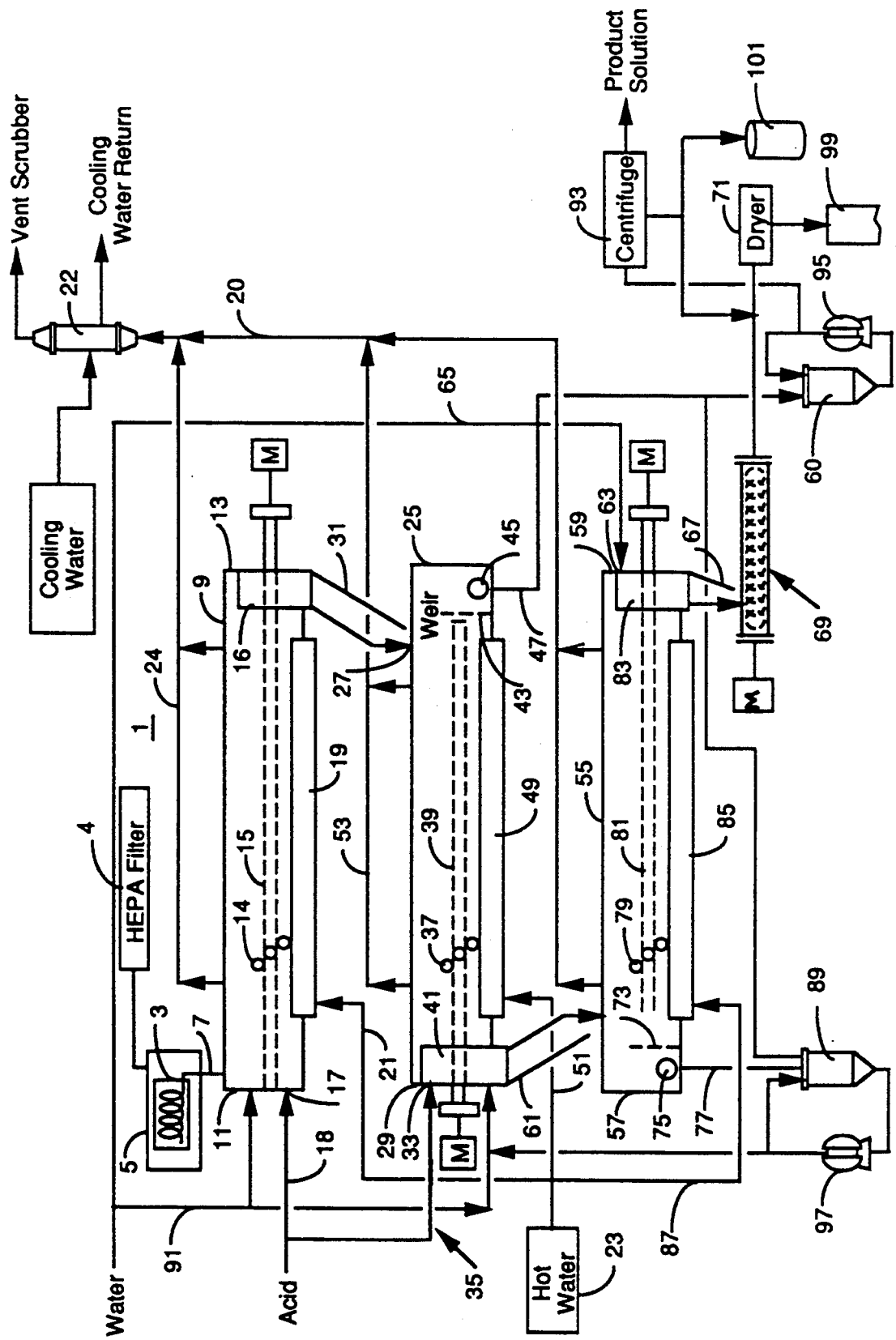

CONTINUOUS ASH EXTRACTION PROCESS

BACKGROUND OF THE INVENTION

This invention relates to a continuous process to extract radioactive metal from incinerator ash and other high-residue waste materials using a cocurrent/countercurrent contactor system. The process achieves nearly complete extraction of the metal, water-washing removal of residual nitric acid extractant, and drying of residues in one continuous operation. A cocurrent reactor means is used in order to overcome a swelling or foaming reaction that would severely limit throughput capability of an all-countercurrent system.

BACKGROUND INFORMATION

Other methods have been used to process incinerator waste materials to extract uranium or similar elements.

U.S. Pat. No. 4,509,978 to Greenhalgh discloses a method of immobilizing sulfate ash to recover transuranic elements. The ash is mixed with a metal to form an alloy with the transuranic elements. The alloy can be redissolved in a catalyzed nitric acid solution to recover the transuranic elements.

U.S. Pat. No. 4,814,046 to Johnson et al. discloses a process for removing transuranic elements from a waste chloride electrolytic salt generated during reprocessing of nuclear fuel. The salt is contacted with a cadmium-uranium alloy which selectively extracts the transuranic elements from the salt.

U.S. Pat. No. 4,749,519 to Koehly et al. discloses a process for the recovery of plutonium contained in solid waste. The waste is contacted with aqueous nitric acid solution for oxidizing the plutonium present in the waste and dissolving it in the nitric acid solution.

U.S. Pat. No. 3,882,040 to Auge et al. discloses a process wherein incinerator ash containing silicon is contacted with nitrosyl fluoride trihydrogen fluoride (NOF.3HF) converting silicon present to silicon tetrafluoride ($SiF_4$) gas, thereby minimizing formation of gelatinous silica polymer in the subsequent treatment of the ash to recover plutonium, americium, and the like.

U.S. Pat. No. 4,177,241 to Divins et al. discloses a process for recovering compounds of enriched nuclear fuel from scrap materials. The process yields an acid solution with nuclear fuel dissolved therein. Apparatus for performing the disclosed process is also disclosed.

U.S. Pat. No. 4,787,979 to Kolarik et al. discloses a liquid-liquid two-phase extraction process in which a feed solution is introduced into an intermediate state of a multistage extraction apparatus. An aqueous extractant flows through the multistate extraction apparatus countercurrent to the extractant and contributes to the aqueous phase. The organic extractant is divided into at least two streams prior to introducing the organic extractant into the apparatus. Each stream is introduced into the apparatus at different stages, both ahead of the intermediate stage.

Prior to this, previous processing involved batch-dissolving of waste radioactive metal materials, followed by filtration separation of insoluble residues, followed by a second batch water-washing of the residues to remove residual nitric acid extractant, followed by a second filtration of water-washed residues, followed by a batch drying of the residues.

OBJECTS OF THE INVENTION

Accordingly, it is an object of this invention to continuously, with nuclearly safe geometry, process radioactive metal from various types of waste for reuse.

It is another object of this invention to create a large liquid-surface-area to reaction-volume ratio in the reaction zone which allows easy dissipation of the reaction gas bubbles generated during dissolution of the oxides of the metal and attendant impurities.

It is another object of this invention to process a range of solids feed quality without major adjustments to operating parameters or processing time.

It is yet another object of this invention to process finely divided refractory constituents (usually poorly oxidized metal) without the need for filtration capability.

These objects and others are satisfied by the following invention.

SUMMARY OF THE INVENTION

This invention relates to a method to continuously extract radioactive metal from oxidized incinerator ash, press cakes, clean scrap and other solids containing high residues of insoluble material using a cocurrent-countercurrent contactor system.

The process uses about 20–30% nitric acid by weight heated to a temperature of about 130°–170° F. as the extractant. The process equipment consists of a continuous solids feed system, acid and water input systems, one cocurrent acid reaction channel, one countercurrent acid reaction channel, one countercurrent water-washing channel, a continuous residue drying system and associate controls and ancillary equipment.

The equipment application and operating technique are a unique aspect of the process in that cocurrent flow use of equipment normally used in a countercurrent flow configuration serves to overcome a serious drawback of channel blockage. This blockage is created during the initial feeding of the dry solids. A combination of slow wetting, which causes cakes of partially wetted solids to stick to and build up on the paddles which move the solids down the channel, and a swelling/foaming, caused by the initial chemical reaction of the solids with the hot acid, creates clumps of material that collect at the solids feed end until they obstruct the flow of the liquid. By making the initial acid/solid contact in a cocurrent channel configuration, reactants move steadily along the channel until the foaming reaction subsides. Then the prereacted mixture is transferred to a countercurrent channel for an unimpeded completion of the extraction.

The initial reaction is carried out in the first contactor means, a cocurrent unit in which both feed solids and acid liquids enter at the same end and travel cocurrent to the discharge end. With both liquid and solid moving in the same direction, there is no impediment created while the wetting and initial reaction foaming are in progress. With the dissipation of the initial reaction, the resulting partially reacted solid oxides and solutions containing the metal will be ready to proceed with the countercurrent separation without further impediment.

The second contactor receives the partially reacted oxide and solution containing the metal by gravity chute from the first contactor at a point spaced from its weir to give some space for solids disengagement. Discharge liquid overflows the weir into a small sump chamber at the end of the contactor and drains into an external container through a drain in the sump. A series of paddles are attached to the center shaft and arranged such that they form a broken helix about the shaft and provide means for moving the partially reacted solids along the channel as the shaft rotates. Fresh acid feeds into the solids discharge end of the second contactor and flows countercurrent to the partially reacted oxides to form a solution containing the metal and exits at the overflow-weir end of the second contactor. After moving countercurrent to the fresh acid, the reaction residues exit through a gravity transfer chute to the third contactor.

The third contactor has water feeding in at the solids discharge end and flows countercurrent to the reaction residues to wash them. A series of paddles provide the means for moving the reacted solids along the channel as the shaft rotates. Washed reaction residues are then discharged from the third contactor by gravity to screw conveyor means and subsequent processing. The used wash water from the third contactor can be used as dilution water for the acid makeup for either or both of the first two contactors.

A portion of the reaction residues are fines small enough to suspend in the liquids. They are carried out with the liquids as they exit the contactor means and present a separation problem downstream. The amount of these particles varies but typically compose about 6% of the total solids. They interfere with subsequent solvent extraction operations. Filtration has previously been used but they are difficult to filter because they blind filter media and slow down filtration substantially. Continuous centrifuging is a preferred alternative for removing these solids. This eliminates a labor intense, high cost (filter media), non-continuous operation currently in use. However, since the separated solids retain solution with a high metal content, a reslurry with rinse water and recentrifuging is necessary to avoid large metal losses.

The extraction efficiencies are very high (99+% uranium recovery) and the process replaces a slow multistep batch process featuring multiple handling steps with a very efficient continuous process.

BRIEF DESCRIPTION OF THE DRAWINGS

A full understanding of the invention can be appreciated from the following detailed description of the invention when read with reference to the accompanying drawing which is a schematic diagram of the extraction system of the invention.

DESCRIPTION OF THE PREFERRED EMBODIMENTS

As an example only, the invention will be described as applied to uranium extraction although it could be used for a variety of other radioactive materials.

The drawing shows a cocurrent-countercurrent system for radioactive metal oxide dissolution in accordance with the invention. The system 1 uses three contactors which in the exemplary system are Greerco contactors. These contactors are developed for countercurrent flow of solids and extractants. In this application one of the contactors uses a cocurrent flow of solids and extractant. In the system 1, a feeder 3 in a hood 5 with a HEPA filter 4 is positioned over an input chute 7 so that feeding occurs as the oxides of the uranium metal drop out of the feeder 3. A Greerco contactor 9 with an intake end 11 and a discharge end 13 is positioned to receive the oxides of uranium from the feeder 3. A series of paddles 14 are attached to a center shaft 15 and arranged so that they form a broken helix about the shaft and provide the means for moving solids along the contactor as the shaft rotates. A scoop/pusher plate assembly 16 is attached to the shaft adjacent to the gravity discharge chute 31. Concentrated nitric acid is diluted with deionized water from line 91 and/or washwater solution from the third contactor and delivered through line 18 to acid introduction apparatus 17 where it is introduced into the intake end 11 of the first contactor 9 so that it flows cocurrent with the oxides of uranium to the discharge end 13 of the first contactor 9. The bottom half of contactor 9 is encapsulated with a heating jacket 19 which allows continuous circulation of hot water through line 21 from supply 23. This keeps the acid at about 130°–170° F. during the reaction of the acid with the metal oxides. Contactor 9 is generally horizontal and includes gas collection line 24 connected to condenser 22 by line 20 for venting gases released during the cocurrent acid and oxide flow. Condensate from condenser 22 drains by gravity back to contactor 9 through line 24.

A second contactor 25 with a solids intake end 27 and a solids discharge end 29 is positioned below the first contactor 9 to receive by chute 31, which feeds solids by gravity, the reacted solids and the uranium solution at the intake end 27 of the second contactor. A second acid introduction apparatus 33 on the solids discharge end 29 of the second contactor 25 introduces concentrated acid through line 35 where it is diluted with dionizod water from line 91 and/or the wash water solution from the third contactor and the acid will flow countercurrently to the partially reacted solids. A series of paddles 37 are attached to the center shaft 39 and arranged such that they form a broken helix about the shaft and provide means for moving solids along the second contactor 25 from the solid intake end 27 to the solids discharge end 29 as the shaft rotates. A scoop/pusher plate assembly 41 is attached to the shaft 39 adjacent to the solids discharge chute 31 to provide the mechanism for lifting and transferring the solid residues out of the contactor 25 as the shaft rotates.

A weir 43 is positioned to control the liquid level in the contactor 25 by setting the overflow level. Discharge liquid overflows the weir 43 into a small sump 45 at the end of the contactor 25 and is drained into an external tank 60 through a drain line 47 where it is pumped by pump 95 to the centrifuge. The bottom half of contactor 25 is encapsulated with a heating jacket 49 which allows continuous circulation of hot water to the second contactor 25 from line 51 in order to maintain the second acid solution at between 130° to 170° F. as it flows through the second contactor 25. A gas collector line 53 collects gases given off during the reaction of the acid with the partially reacted oxides in the second contactor 25 and carries the gas through line 20 to condenser 22 then to a vent scrubber.

A third contactor 55 with solids intake end 57 and solids discharge end 59 is positioned below the second contactor 25 to receive the reaction residues by chute 61 at the solids intake end 57 of the third contactor 55. A water introduction apparatus 63 introduces water from line 65 at the solids discharge end 59 of the third contactor 55 so that water flows countercurrent to the reaction residues and washes the reaction residues. A chute 67 on the solids discharge end 59 of the third contactor removes washed reaction residues from the third contactor to a screw conveyor 69 which delivers them to a dryer 71 then to a residue discharge container 99. A weir 73 is positioned to control the liquid level in the contactor 55 by setting the overflow level. Discharge liquid overflows the weir 73 into a small sump 75 at the end of the contactor 55 and is drained into an external tank 89 through a drain 77. This wash water is pumped by pump 97 and is recycled and used to dilute the concentrated acid used in the first and second contactors. A series of paddles 79 as in contactor one and two are attached to the center shaft 81. A scoop/pusher mechanism 83 is attached to the shaft adjacent to the solids discharge chute 67 to provide the mechanism for lifting and transferring the washed solid residue out of the channel as the shaft rotates. The bottom half of the contactor 55 is encapsulated with a heating jacket 85 which allows continuous circulation of hot water from line 87 to the contactor exterior in that area.

The solution containing the desired uranium collected from contactors 9 and 25 is transferred to a collecting tank 60. If insoluble fines are suspended in the solution containing the desired uranium, the solution is pumped by pump 95 and is centrifuged in centrifuge 93 to remove them. The centrifuged solids are reslurried in the water and recentrifuged to avoid uranium losses, then dried and are transferred to solids collection container 101.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims.

I claim:

1. A process for recovering radioactive metal from solid oxides of said metal, the process comprising:
   exposing said oxide of said metal to a cocurrent flow of a first acid solution in a first contactor means to form partially reacted oxides and a solution containing said metal;
   drawing off said solution containing said metal and passing said partially reacted oxides through a countercurrent flow of a second acid solution in a second contactor means to form reaction residues and a second solution containing said metal;
   drawing off said second solution containing said metal and passing said reaction residues through a countercurrent flow of wash water to wash said reaction residues; and
   separating said reaction residues from said wash water.

2. A process according to claim 1, wherein said first contactor means is generally horizontal so that gases are vented from said cocurrent flow of oxides and acid.

3. A process according to claim 2, wherein about 20–30% nitric acid by weight is used as an extractant for said metal.

4. A process according to claim 3, wherein about 30% nitric acid by weight is used as an extractant for said metal.

5. A process according to claim 4, wherein heat is applied to said first and second contactor to maintain the acid solution at about 130°–170° F.

6. A process according to claim 5, wherein said first and second solution containing said metal contains fines of said oxides and included in said process is the step of separating said fines.

7. An apparatus for recovering radioactive metals from solid oxides of said metals, the apparatus comprising:
   a first contactor means through which said solid oxides of said metals are passed with a cocurrent flow of an acid solution so that said acid solution extracts said metal from said oxides of said metal to form a solution containing said metal and partially reacted oxides;
   means for drawing off said solution containing said metal from said partially reacted oxides;
   a second contactor means through which said partially reacted oxides are passed with a countercurrent flow of a second acid solution to extract the remaining metal from said partially reacted oxides leaving reaction residues and a solution containing said metal;
   means for drawing off said solution containing said metal from said reaction residues;
   a third contactor means in which said reaction residues are washed.

8. An apparatus in claim 7, wherein said first contactor means is generally horizontal and includes means for venting gases from said cocurrent flow.

9. An apparatus as in claim 8, wherein heater means are applied to said first and second contactors to maintain said acid solutions at about 130°–170° F.

10. An apparatus as in claim 9, wherein separation means are used to separate fines suspended in said first and second solution containing said metal.

11. An apparatus as in claim 10, wherein about 20–30% nitric acid by weight is used as an extractant for said oxides of said metal.

12. An apparatus as in claim 11, wherein gravity feeder means are used to transfer reactants into said first, second and third contactor means.

13. An apparatus for recovering radioactive metals from oxides of said metals, the apparatus comprising:
   a first contactor means with an intake end and a discharge end;
   feeder means and a chute positioned so that gravity feeding occurs as said oxides of said metal leave said feeder means and enter said intake end of said first contactor;
   first acid introduction means for introducing acid into said intake end of said first contactor means so that said acid flows cocurrent with said oxides of said metal to said discharge end of said first contactor means;
   second contactor means with a solids intake end and a solids discharge end positioned to receive by gravity feeding said partially reacted oxides at said intake end;
   second acid introduction means to introduce acids at said discharge end of said second contactor means so that said acid flows countercurrent to said partially reacted oxides;
   third contactor means with an intake end and a discharge end positioned to receive reaction residues by gravity feeding at said intake end;
   water introduction means to introduce water into said third contactor means so that said water washes said reaction residues.

14. An apparatus as in claim 13, wherein gravity feeding means transfer solids between contactor means.

15. An apparatus as in claim 14, wherein said first contactor means is generally horizontal so that gases are vented from said cocurrent flow of oxides and acid.

16. An apparatus as in claim 15, wherein heater means maintain the acid solution at about 130°–170° F. in said first and second contactor means.

17. An apparatus as in claim 16, wherein first and second discharge means are used to effect separation of said first and second solution containing said radioactive metal from said partially reacted oxides and reaction residues.

18. An apparatus according to claim 17, wherein centrifuge means are used to separate fines suspended in said first and second solution containing said radioactive metal.

19. An apparatus according to claim 18, wherein about 20–30% nitric acid by weight is used as an extractant for said radioactive metal.

20. An apparatus according to claim 19, wherein about 30% nitric acid by weight is used as an extractant for said radioactive metal.

* * * * *